(12) United States Patent
Manabe et al.

(10) Patent No.: US 7,833,589 B2
(45) Date of Patent: Nov. 16, 2010

(54) LIQUID CRYSTAL-CONTAINING COMPOSITION, AND LIQUID CRYSTAL DISPLAY DEVICE INCLUDING THE SAME

(75) Inventors: Chikara Manabe, Kanagawa (JP); Naoki Hiji, Kanagawa (JP); Takeo Kakinuma, Kanagawa (JP); Tadayoshi Ozaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/246,862

(22) Filed: Oct. 7, 2008

(65) Prior Publication Data

US 2009/0162575 A1  Jun. 25, 2009

(30) Foreign Application Priority Data

Dec. 21, 2007  (JP) .............................. 2007-330589

(51) Int. Cl.
*C09K 19/36* (2006.01)
*C09K 19/54* (2006.01)
*G02F 1/1334* (2006.01)

(52) U.S. Cl. ..................... 428/1.1; 428/1.5; 252/299.5; 252/299.7; 349/89; 349/91

(58) Field of Classification Search .............. 252/299.7, 252/299.5; 428/1.5, 1.1; 349/89, 91
See application file for complete search history.

(56) References Cited

U.S. PATENT DOCUMENTS 7,465,480 B2 * 12/2008 Hiji et al. ...................... 428/1.2
2005/0244590 A1 * 11/2005 Hiji et al. ...................... 428/1.1

FOREIGN PATENT DOCUMENTS

| JP | A 5-80303 | 4/1993 |
| JP | A 6-134293 | 5/1994 |
| JP | A 6-226082 | 8/1994 |
| JP | A 9-15568 | 1/1997 |
| JP | A 2005-316243 | 11/2005 |

\* cited by examiner

*Primary Examiner*—Shean C Wu
(74) *Attorney, Agent, or Firm*—Oliff & Berridge, PLC

(57) ABSTRACT

A liquid crystal-containing composition and a liquid crystal display device including the same, the liquid crystal-containing composition including a cholesteric liquid crystal and microcapsules containing the cholesteric liquid crystal, and having a wall component comprising at least one selected from the group consisting of polyurethane and polyurea, the wall component further including a first isocyanurate component having a cyclo ring structure and a second isocyanate component other than the first isocyanurate component.

11 Claims, 4 Drawing Sheets

LIQUID CRYSTAL-CONTAINING COMPOSITION, AND LIQUID CRYSTAL DISPLAY DEVICE INCLUDING THE SAME

CROSS-REFERENCE TO RELATED APPLICATIONS

This application is based on and claims priority under 35 USC 119 from Japanese Patent Application No. 2007-330589 filed Dec. 21, 2007.

BACKGROUND

Technical Field

The present invention relates to a liquid crystal-containing composition, and a liquid crystal display device including the same.

A cholesteric liquid crystal is composed of rod-like molecules disposed spirally, and interferes with and reflects light corresponding to the spiral pitch thereof (referred to as selective reflection). Therefore, when the spiral pitch has a size corresponding to the wavelengths of red, green, and blue colors, a vivid color display is provided without a color filter.

For example, a cholesteric liquid crystal filled in a cell composed of a pair of substrates each having an electrode is known to assume two alignment states: planar (P) alignment and focal conic (F) alignment. The P alignment is a state in which the spiral axis is aligned perpendicular to the substrate surface, and causes selective reflection. The F alignment is a state in which the spiral axis is aligned in parallel with the substrate surface, and transmits light. The two alignment states are changed each other when a voltage is applied between the electrodes.

Therefore, when a light absorber, for example, a black color, is disposed on the back of the cell, a bright display giving a selective reflection color is provided under the P alignment state, and a dark display giving a black color of the light absorber is provided under the F alignment state. Of the above-described alignment states, the P and F alignment states are stably retained with no power. Utilizing the property, a memory display which retains its display with no power is realized.

SUMMARY

According to an aspect of the present invention, there is provided a liquid crystal-containing composition composed of a cholesteric liquid crystal and microcapsules containing the cholesteric liquid crystal and having a wall component comprising of at least one selected from polyurethane and polyurea, a first isocyanurate component having a cyclo ring structure, and a second isocyanate component other than the first isocyanurate component.

BRIEF DESCRIPTION OF THE DRAWINGS

Exemplary embodiments of the present invention will be described in detail based on the following figures, wherein.

DETAILED DESCRIPTION

Figure 1:
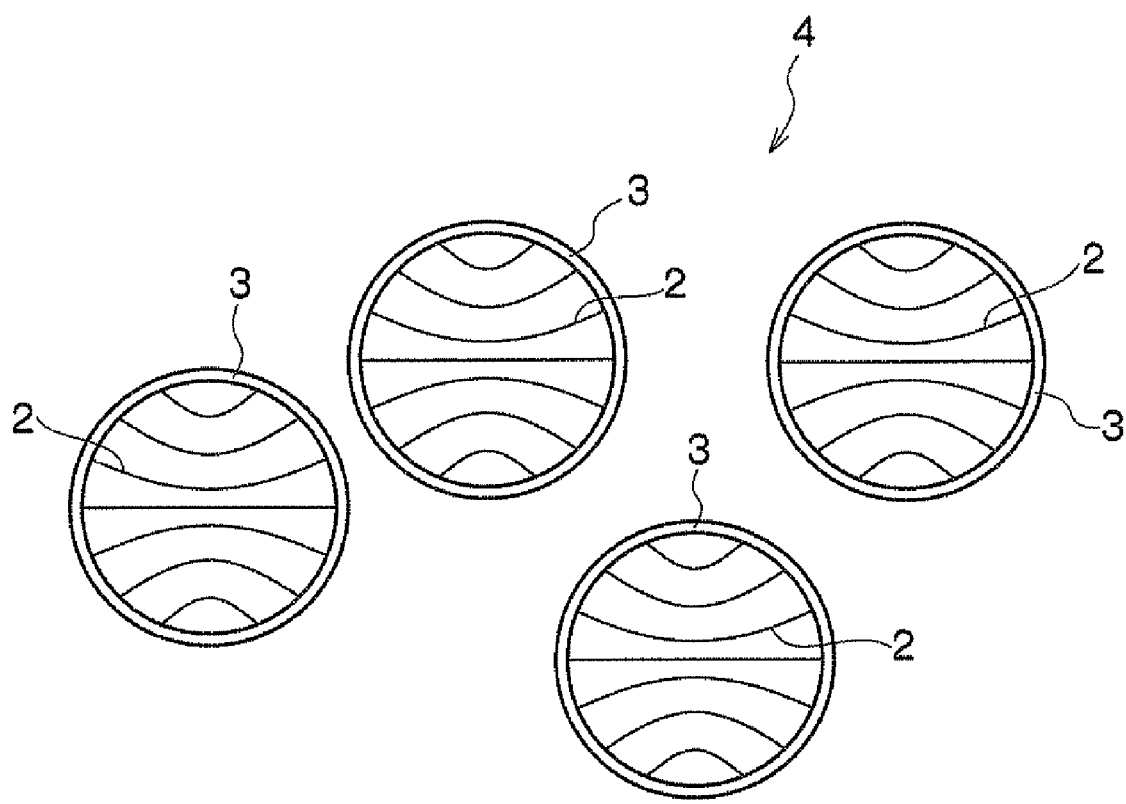
FIG. 1 is a schematic sectional diagram showing an example of the liquid crystal-containing composition according to an exemplary embodiment.

Exemplary embodiments of the present invention are illustrated below with reference to the following drawings. Members having substantially the same function and effect are denoted by the same reference numerals throughout all the drawings, and repetitive description thereof may be omitted.

Figure 2:
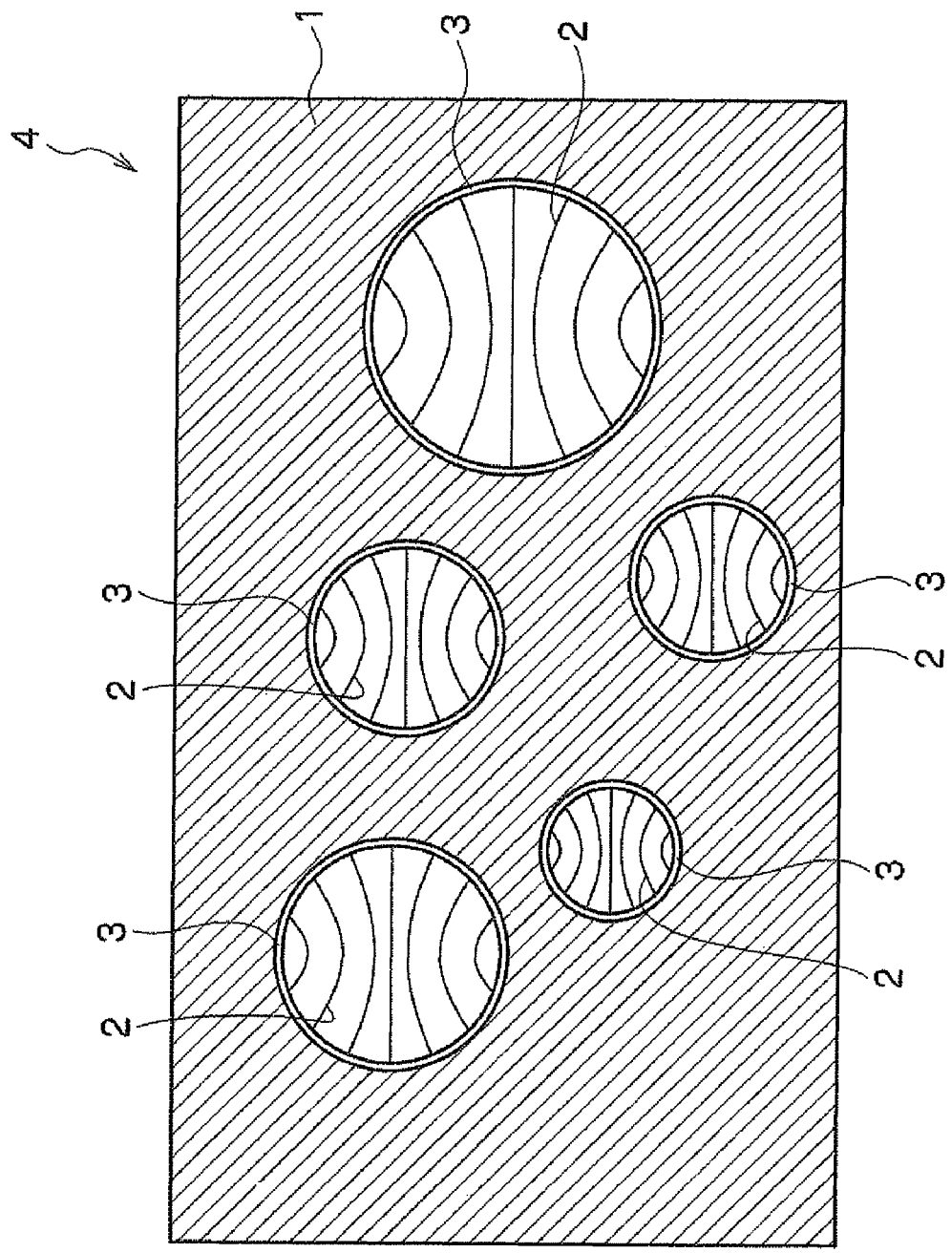
FIG. 2 is a schematic sectional diagram showing another example of the liquid crystal-containing composition according to an exemplary embodiment.

FIG. 1 is a schematic view showing the liquid crystal-containing composition according to an exemplary embodiment. FIG. 2 is a schematic view showing the liquid crystal-containing composition according to another exemplary embodiment.

The liquid crystal-containing composition 4 according to an exemplary embodiment includes, for example, as shown in FIG. 1, a cholesteric liquid crystal 2 and microcapsules 3 containing the cholesteric liquid crystals 2. The microcapsules 3 include a wall component composed of at least one selected from polyurethane and polyurea, and the wall component includes a first isocyanurate component having a cyclo ring structure, and a second isocyanate component other than the first isocyanurate component.

The liquid crystal-containing composition 4 according to an exemplary embodiment may include, for example, as shown in FIG. 2, microcapsules 3 containing a cholesteric liquid crystal 2, and a resin member 1 wherein the microcapsules 3 are dispersed and held.

The liquid crystal-containing composition 4 according to an exemplary embodiment may be a slurry composition including microcapsules 3 containing a cholesteric liquid crystal 2, or an ink composition wherein the slurry composition is mixed with a binder polymer.

In the liquid crystal-containing composition 4 according to an exemplary embodiment, when the microcapsules 3 containing the cholesteric liquid crystal 2 have the above-described structure, the influence of orientation constraint on the cholesteric liquid crystal 2 by the microcapsules 3 is reduced, and thus the occurrence of afterimage phenomenon is prevented. The afterimage phenomenon is observed when, for example, a white screen is displayed after a black screen, the reflectance at that time is lower than that given when a white screen is displayed after a white screen. In addition, CR (contrast) improves.

In particular, according to the exemplary embodiment wherein the microcapsules 3 are dispersed and held in the resin member 1, flowability of the liquid crystal (microcapsules containing the liquid crystal) is suppressed, whereby image stability against deformation by compression or bending is improved. The influence of orientation constraint by the resin member 1 is striking, but the microcapsules 3 containing the cholesteric liquid crystal 2 having the above-described structure prevents the occurrence of afterimage phenomenon.

The liquid crystal-containing composition according to an exemplary embodiment is illustrated below. The reference numerals are omitted in the following explanation. In the first place, the cholesteric liquid crystal is further described. A cholesteric liquid crystal is a liquid crystal material containing an optically-active compound, and is obtained by, for example, (1) a method of adding, for example, an optically-active compound referred to as a chiral reagent into a nematic liquid crystal, or (2) a method of using a liquid crystal material which itself is optically-active such as a cholesterol derivative. In the former case, examples of the nematic liquid crystal material include known nematic liquid crystal-containing compositions such as cyanobiphenyl-based, phenyl cyclohexane-based, phenyl benzoate-based, cyclohexyl benzoate-based, azo methine-based, azobenzene-based, pyrimidine-based, dioxane-based, cyclohexyl cyclohexane-based, stilbene-based, and tran-based ones. Examples of the chiral reagent include cholesterol derivatives and compounds having an optically-active group such as a 2-methylbutyl group.

The cholesteric liquid crystal may contain an additive such as a dye and particles. The cholesteric liquid crystal may be a gel prepared by using a crosslinkable polymer or hydrogen-bonding gelling agent. In addition, the cholesteric liquid crystal may be either a high, middle, or low molecular weight liquid crystal, or a mixture thereof. The spiral pitch of the cholesteric liquid crystal may be changed according to the type or addition amount of the chiral reagent, or the material of the liquid crystal. The wavelength of the selective reflection may be in the visible wavelength range, ultraviolet wavelength or infrared wavelength range. In order to acquire a memory property, the average particle diameter of the below-described cholesteric liquid crystal drops (including microcapsule) dispersed in a polymer is preferably at least three times larger than the spiral pitch of the cholesteric liquid crystal.

The microcapsules are further described below.

The microcapsules include a wall component composed of at least one selected from polyurethane and polyurea, and the wall component includes a first isocyanurate component having a cyclo ring structure, and a second isocyanate component other than the first isocyanurate component. The microcapsules may include, as necessary, a polyol component and a vertical orientation component (at least one such as an alkyl group and a fluoroalkyl group).

The microcapsules may be formed by a known method. Specifically, for example, a core material (cholesteric liquid crystals), polyvalent isocyanates (the first isocyanurate component having a cyclo ring structure, and a second isocyanate component other than the first isocyanurate component.), and a substance which reacts with the isocyanates to form the wall of microcapsules (for example, polyol, polyamine, prepolymer having two or more amino groups, piperazine, or a derivative thereof) are mixed in a water-soluble polymer aqueous solution (aqueous phase) or an oil medium (oil phase) to be encapsulated, emulsified and dispersed in water, and then heated to cause polymer formation reaction at the interface between the aqueous phase and the oil phase, thereby forming the wall of microcapsules. The method is not limited to the above example.

The first isocyanurate giving the isocyanurate component having a cyclo ring structure is preferably at least one selected from the isocyanurates and derivatives thereof expressed by the structural formulae (1) and (2) (examples of the derivatives include isocyanurates such as methyl-2,4-bis(isocyanatemethyl)cyclohexane and 1,3,5-trimethylisocyanate cyclohexane). The isocyanurate expressed by the structural formula (1) is commercially available as "TAKENATE D-127N" (tradename, manufactured by Takeda Pharmaceutical Company Limited). The isocyanurate expressed by the structural formula (2) is commercially available as, for example, "DESMODUR Z4470" (trade name, manufactured by Sumitomo-Bayer Urethane Co., Ltd.).

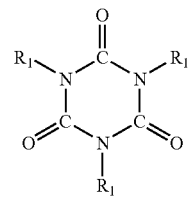

structural formula (1)

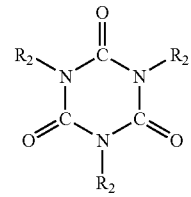

structural formula (2)

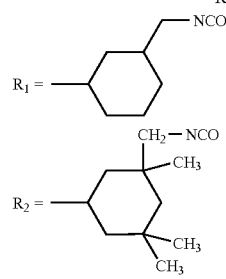

Other examples of the first isocyanurate giving the isocyanurate component having a cyclo ring structure include 1,3-cyclopentene diisocyanate, 1,3-cyclohexane diisocyanate, dicyclohexylmethane diisocyanate, and methyl-2,4-cyclohexane diisocyanate.

In order to prevent the decrease of CR (contrast) at low temperatures, the content of the first isocyanurate component having a cyclo ring structure is more preferably 1 wt % or about 1 wt % or more, and particularly preferably 5 wt % or about 5 wt % or more with respect to the total isocyanate component. On the other hand, in order to prevent the afterimage phenomenon, the upper limit of the content is preferably 20 wt % or about 20 wt %. The total isocyanate component refers to the sun of the first isocyanurate component having a cyclo ring structure, and a second isocyanate component other than the first isocyanurate component included in the wall component.

Examples of the isocyanate derived from the second isocyanate component other than the first isocyanurate component may be a polyvalent isocyanate, and examples thereof include diisocyanates such as tolylene diisocyanate, xylene diisocyanate, hexamethylene diisocyanate, isophorone diisocyanate, and diphenylmethane diisocyanate, triisocyanates, and tetraisocyanates. Other examples of the isocyanate include adducts, buret products, cyanurates (eyanurates other than the first isocyanurate component having a cyclo ring structure) of the diisocyanates, triisocyanates, and tetraisocyanates, and polyisocyanate prepolymers. The content of the second isocyanate component is, for example, the amount of the total isocyanate component excluding the component other than the isocyanurate component.

Preferable examples of the polyol component include a polyester polyol component and a polyether polyol component. In particular, in order to improve the CR (contrast) and prevent the afterimage phenomenon, a polyester polyol component may be preferable. The polyol component such as polyester polyol or polyether polyol is included in the wall of microcapsules by being added together with the microcapsule materials.

Examples of the polyester polyol include polyester polyols obtained by reaction between dibasic acids (for example, terephthalic acid, isophthalic acid, adipic acid, azelaic acid, and sebacic acid), dialkyl esters thereof, or mixtures thereof and glycols (for example, ethylene glycol, propylene glycol, diethylene glycol, butylene glycol, neopentyl glycol, 1,6-hexane glycol, 3-methyl-1,5-pentanediol, 3,3'-dimethylolheptane, polyoxyethylene glycol, polyoxy propylene glycol, and polytetramethylene ether glycol) or mixtures thereof. Examples of polyester polyol include those obtained by ring opening polymerization of lactones (for example, polycaprolactone, polyvalerolactone, and poly($\beta$-methyl-$\gamma$-valerolactone)).

Examples of polyether polyol include polyethylene glycol, polyoxyethylene glycol, polyoxypropylene glycol, polytetramethylene glycol, and copolymers thereof.

The weight average molecular weight of the polyol component is preferably 20,000 or about 20,000 or more and 1,000,000 or about 1,000,000 or less, more preferably 20,000 or about 20,000 or more and 500,000 or about 500,000 or less, and even more preferably 20,000 or about 20,000 or more and 50,000 or about 50,000 or less. If the weight average molecular weight is beyond the predetermined range, in particular, the afterimage phenomenon is effectively prevented. However, if the weight average molecular weight is too high, compatibility of the component with the solvent decreases as the decrease of solubility, which may result in the fail to uniform formation of microcapsules.

The weight average molecular weight is measured by gel permeation chromatography (GPC). The GPC equipment is 8020 series (manufactured by Tosoh Corporation), the columns are TSK gel, G4000HXL, G2500HXL, and G1000HXL (manufactured by Tosoh Corporation, 7.8 mm I.D.×30 cm), and the eluent is THF (tetrahydrofuran). The test conditions are as follows: the sample concentration is 0.2 wt %, the flow rate is 1 ml/min, the sample injection amount is 50 µl, and the measurement temperature is 40° C. A differential refractometer is used for the measurement.

The content of the polyester polyol component is preferably 1 wt % or about 1 wt % or more and 50 wt % or about 50 wt % or less, more preferably 5 wt % or about 5 wt % or more and 25 wt % or about 25 wt % or less, and even more preferably 10 wt % or about 10 wt % or more and 15 wt % or about 15 wt % or less with respect to the total capsule wall component. When the content is within the range, the CR (contrast) may be effectively improved, and the afterimage phenomenon may be reduced.

The vertical orientation component is introduced to the microcapsules by, for example, adding an orientation material composed of a compound having an alkyl group and/or a fluoroalkyl group and a hydroxy group together with the materials of the microcapsules. The horizontal orientation intrinsic to the polymer (microcapsules) is cancelled by the vertical orientation of the vertical orientation component, whereby the orientation constraint is weakened. As a result of this, a cholesteric liquid crystal layer having no curvature is formed, whereby the color purity and display contrast are improved. In addition, the orientation constraint is so weak that the liquid crystal molecules in contact with the polymer exhibit little energy difference regardless the orientation direction, and thus may be stable over time in the P and F orientation. The details about the vertical orientation component are the same as those described in Japanese Patent Application Laid-Open (JP-A) Publication No. 2005-316243.

When the vertical orientation component is contained in the microcapsules, the afterimage phenomenon tends to occur. In the exemplary embodiment, the afterimage phenomenon may be prevented.

As described above, the liquid crystal-containing composition according to the exemplary embodiment is used, for example, in the form of a dispersion of the microcapsules containing the cholesteric liquid crystal in a binder material. The dispersion is applied to various surfaces. The liquid crystal is protected by the microcapsules, so that other functional layers may be formed thereon, and has excellent mechanical strength against compression or bending. Accordingly, the composition has a wide application range. Through the use of a curable binder material, the layer of the composition is formed and cured, and thus a resin member, in which the microcapsules containing the cholesteric liquid crystal are dispersed and held, is formed.

The liquid crystal-containing composition according to a present exemplary embodiment is applied onto a substrate by a printing method such as a screen printing, a letterpress printing, an intaglio printing, a planographic printing, or a flexographic printing, or a coating method such as a spin coating, a bar coating, a dip-coating, a roll coating, a knife coating, or a die coating.

The liquid crystal-containing composition according to a present exemplary embodiment is used for, for example, a display device, an image/information recording device, or a spatial light modulator. In particular, the composition is preferably used for a display device, more specifically a liquid crystal display device. The liquid crystal display device according to a present exemplary embodiment is further described below.

Figure 3:
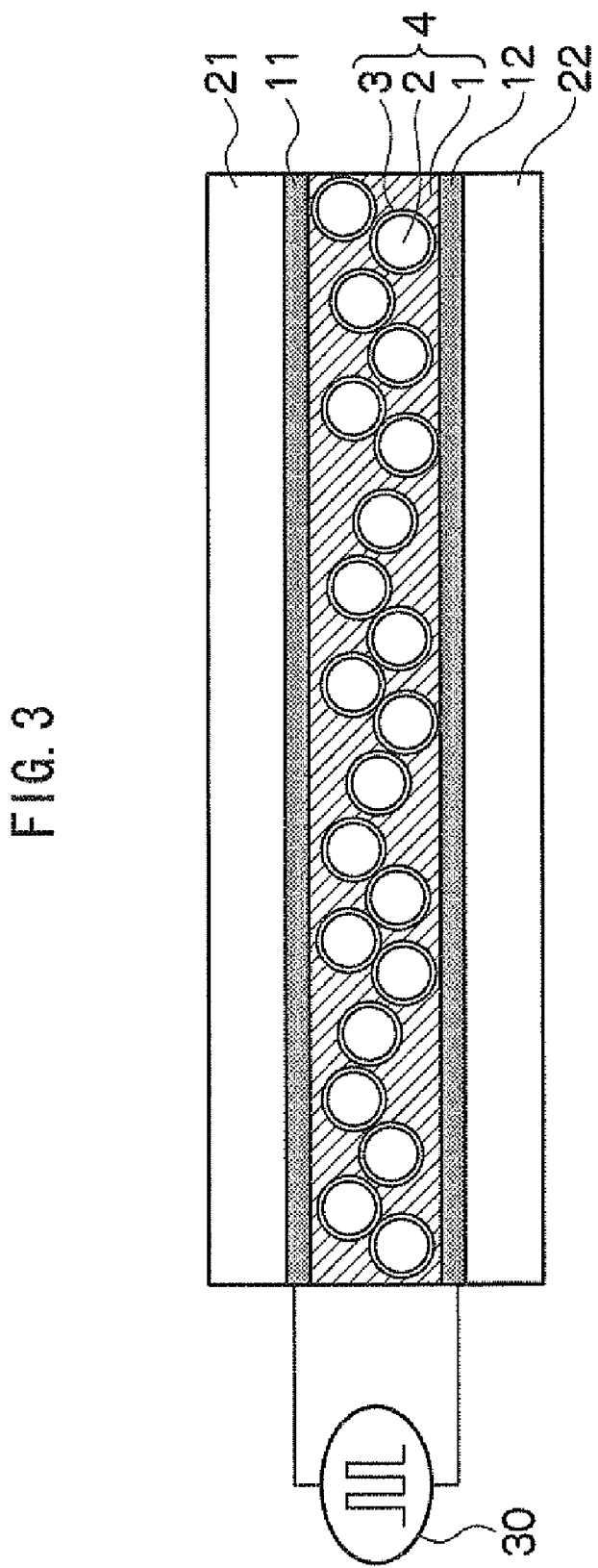
FIG. 3 is a schematic sectional diagram showing an example of the liquid crystal display device according to an exemplary embodiment.

The liquid crystal display device according to a present exemplary embodiment is composed of the liquid crystal-containing composition according to a present exemplary embodiment sandwiched between a pair of electrodes. More specifically, for example, as shown in FIG. 3, a liquid crystal-containing composition 4 is sandwiched between substrates 21 and 22 having an electrode 11 and 12, respectively, to which voltage pulses are applied by a driving circuit 30 to provide a display. As a display background, a light absorption member may be provided between the liquid crystal-containing composition 4 and the electrode 12, or on the back of the substrate 22. Examples of the material of the substrates 21 and 22 include glass and a resin (a transparent dielectric material such as polyethylene terephthalate, polyether sulfone, polycarbonate, or polyolefin). Examples of the material of the electrodes 11 and 12 include a transparent conductive film such as an indium oxide tin alloy or zinc oxide.

The liquid crystal display device shown in FIG. 3 is a form of the liquid crystal-containing composition 4 composed of the microcapsules 3, which contain the cholesteric liquid crystal 2, dispersed and held in the resin member 1.

In the liquid crystal display device according to a present exemplary embodiment, the liquid crystal-containing composition according to a present exemplary embodiment is adapted to emphasize the optical difference between the P alignment and F alignment in the memory state of the cholesteric liquid crystal. Therefore, the display mode may adopt, in addition to the above-described selective reflection mode, a scattering-transmission mode using the difference in the light scattering strengthes of the P alignment and F alignment, an optical rotatory mode using the difference in the optical rotation, or a birefringence mode using the difference in birefringence. In this case, a polarizing plate or a retardation film may be used as a auxiliary member. Further, the liquid crystal may contain a dichroic dye to provide a display in a gest-host mode.

The liquid crystal display device according to a present exemplary embodiment is driven by a known driving method, such as: 1) a segment driving method of driving the device sandwiched between electrodes which have been patterned on the display form; 2) a simple matrix driving method in which the liquid crystal-containing composition is sandwiched between a pair of intersecting (for example at right angles) stripe electrode substrates, successively scanned line by line to form an image, 3) an active matrix driving method in which driving is conducted through an active device, such as a thin-film transistor, thin film diode, or MIM (metal-insulator-metal) device, provided on each pixel; 4) an optical driving method in which the liquid crystal-containing composition stacked on a photoconductor is sandwiched between a pair of electrodes, to which a voltage is applied while a light image is projected thereon to write an image; 5) a heat driving method in which a voltage is applied to the liquid crystal-containing composition sandwiched between a pair of electrodes to effect a transition to the P alignment, subsequently the composition is heated to a temperature higher than the phase transition temperature by using a laser or thermal to write an image; and 6) an electrostatic driving method in which the liquid crystal-containing composition is applied onto an electrode substrate, on which an image is written using a stylus head or ion head.

The present invention is further illustrated with reference to, but not limited to, the following Examples. Unless otherwise specified, "part" means "parts by weight".

Example A

Example A1

86.25 parts of a nematic liquid crystal E7 (manufactured by Merck Ltd.), 11.0 parts of a chiral reagent R811 (manufactured by Merck Ltd.), and 2.75 parts of a chiral reagent R1011 (manufactured by Merck Ltd.) are mixed to obtain 100 parts of a cholesteric liquid crystal which selectively reflects a wavelength of 650 nm. The cholesteric liquid crystal, 8.5 parts of "TAKENATE D-110N" (tradename, manufactured by Mitsui Chemicals Polyurethanes, Inc.) as polyvalent isocyanate, and 1.5 parts of "DESMODUR Z4470" (tradename, manufactured by Sumitomo-Bayer Urethane Co., Ltd.), and 3 parts of octadecanol (manufactured by Aldrich) as a precursor of the vertical orientation component, and 0.8 parts of polyester polyol (tradename, "TAKELAC A385", manufactured by Mitsui Chemicals Polyurethanes, Inc.) are dissolved in 1,000 parts of ethyl acetate to make an oil phase composition. The composition is added to 10,000 parts of a 1% polyvinyl alcohol aqueous solution, and stirred and dispersed with a mixer to make an o/w emulsion having a volume average particle diameter of 7 μm.

To the emulsion 100 parts of a 10 wt % polyallylamine aqueous solution (manufactured by Nitto Boseki Co., Ltd.) are added, and heated at 70° C. for 2 hours to make microcapsules walled with polyurea. The microcapsules are collected by centrifugation, and mixed with a polyvinyl alcohol aqueous solution to make a microcapsule liquid crystal paint.

Thereafter, the microcapsule liquid crystal paint is applied onto a commercially available ITO-vapor deposited PET resin film by using an applicator so as to give a dry film thickness of 30 μm. On the coating, a dispersion of carbon black in a polyvinyl alcohol aqueous solution is applied so as to give a dry film thickness of 3 μm to make a light absorption layer. Aside from this, a two-pack urethane-based adhesive is applied onto another ITO-vapor deposited PET resin film so as to give a dry film thickness of 3 μm. The film is bonded to the substrate coated with the microcapsule liquid crystal paint to make a liquid crystal display device.

The liquid crystal display device is subjected to evaluations of afterimage index and CR (contrast). The results are shown in Table 1.

CR (Contrast)

The voltage (V)-reflectance (Y) characteristic of the liquid crystal display device sample is measured, and the ratio between the maximum reflectance and minimum reflectance is defined as CR (contrast). A symmetrical rectangular wave pulse (reset voltage) having a voltage of 600 V, a frequency of 1 kHz, and a length of 1 second is applied to the space between the upper and lower electrodes of the liquid crystal display device sample, and a white screen is uniformly displayed on the liquid crystal display sample (white reset). Subsequently, a writing voltage V (a symmetrical rectangular pulse having a frequency of 1 kHz and a length of 200 msec) is applied, and 3 seconds after application the luminous reflectance is measured. This measurement is repeated for each of incremental increases in the writing voltage, and thereby the voltage-reflectance characteristic Ywr (V) may be determined. Reflectance is measured in terms of luminous reflectance with a spectrophotometer CM-2022 (manufactured by Minolta Co., Ltd.). The CR evaluation is conducted with the liquid crystal display device cooled to a temperature of 10° C. The CR at 25° C. and 40° C. is evaluated only for the following liquid crystal display device of Comparative Example A1.

Examples A2 to A3, Comparative Examples A1 to A9

Liquid crystal display devices are made and evaluated in the same manner as Example 1, except that the polyvalent isocyanate is changed according to Table 1. The results are shown in Table 1.

TABLE 1

| | Polyvalent isocyanate | | Evaluation |
| --- | --- | --- | --- |
| | isocyanate (1) | isocyanate (2) | Contrast (10° C.) |
| Example A1 | DESMODUR Z4470 | D-110N | 7.8 |
| | isocyanurate(P), cyclo ring(P) | isocyanurate(A), cyclo ring(A) | |
| Example A2 | D-127N | D-110N | 7.0 |
| | isocyanurate(P), cyclo ring(P) | isocyanurate(A), cyclo ring(A) | |

TABLE 1-continued

| | Polyvalent isocyanate | | Evaluation |
|---|---|---|---|
| | isocyanate (1) | isocyanate (2) | Contrast (10° C.) |
| Example A3 | DESMODUR Z4470 isocyanurate(P), cyclo ring(P) | D-120N isocyanurate(A), cyclo ring(P) | 7.0 |
| Comparative Example A1 | None | D-110N (10 parts) isocyanurate(A), cyclo ring(A) | 42 (20° C.: 11.6, 40° C.: 16.7) |
| Comparative Example A2 | D-103H isocyanurate(A), cyclo ring(A) | D-110N isocyanurate(A), cyclo ring(A) | 4.0 |
| Comparative Example A3 | D-160N isocyanurate(A), cyclo ring(A) | D-110N isocyanurate(A), cyclo ring(A) | 3.7 |
| Comparative Example A4 | D-120N isocyanurate(A), cyclo ring(P) | D-110N isocyanurate(A), cyclo ring(A) | 3.8 |
| Comparative Example A5 | D-140N isocyanurate(A), cyclo ring(P) | D-110N isocyanurate(A), cyclo ring(A) | 4.2 |
| Comparative Example A6 | D-262 isocyanurate(P), cyclo ring(A) | D-110N isocyanurate(A), cyclo ring(A) | 4.5 |
| Comparative Example A7 | D-170N isocyanurate(P), cyclo ring(A) | D-110N isocyanurate(A), cyclo ring(A) | 3.9 |
| Comparative Example A8 | D-165N isocyanurate(A), cyclo ring(A) | D-110N isocyanurate(A), cyclo ring(A) | 4.0 |
| Comparative Example A9 | D-178N isocyanurate(A), cyclo ring(A) | D-110N isocyanurate(A), cyclo ring(A) | 5.1 |

*Polyvalent isocyanate products
DESMODUR Z4470 is manufactured by Sumitomo-Bayer Urethane Co., Ltd.
Other products are TAKENATE series manufactured by Takeda Pharmaceutical Company Limited.
**(P): present, (A): absent Table 2 shows the isocyanate species of the above commercial products and modifications thereof.

| Isocyanate species | Modifications | | | | |
|---|---|---|---|---|---|
| | TMP adduct | isocyanurarate | Biuret | Allophanate | |

(Table contains chemical structure diagrams for TDI and its modifications including TMP adduct, D-103H, isocyanurate, D-262, Biuret, and Allophanate.)

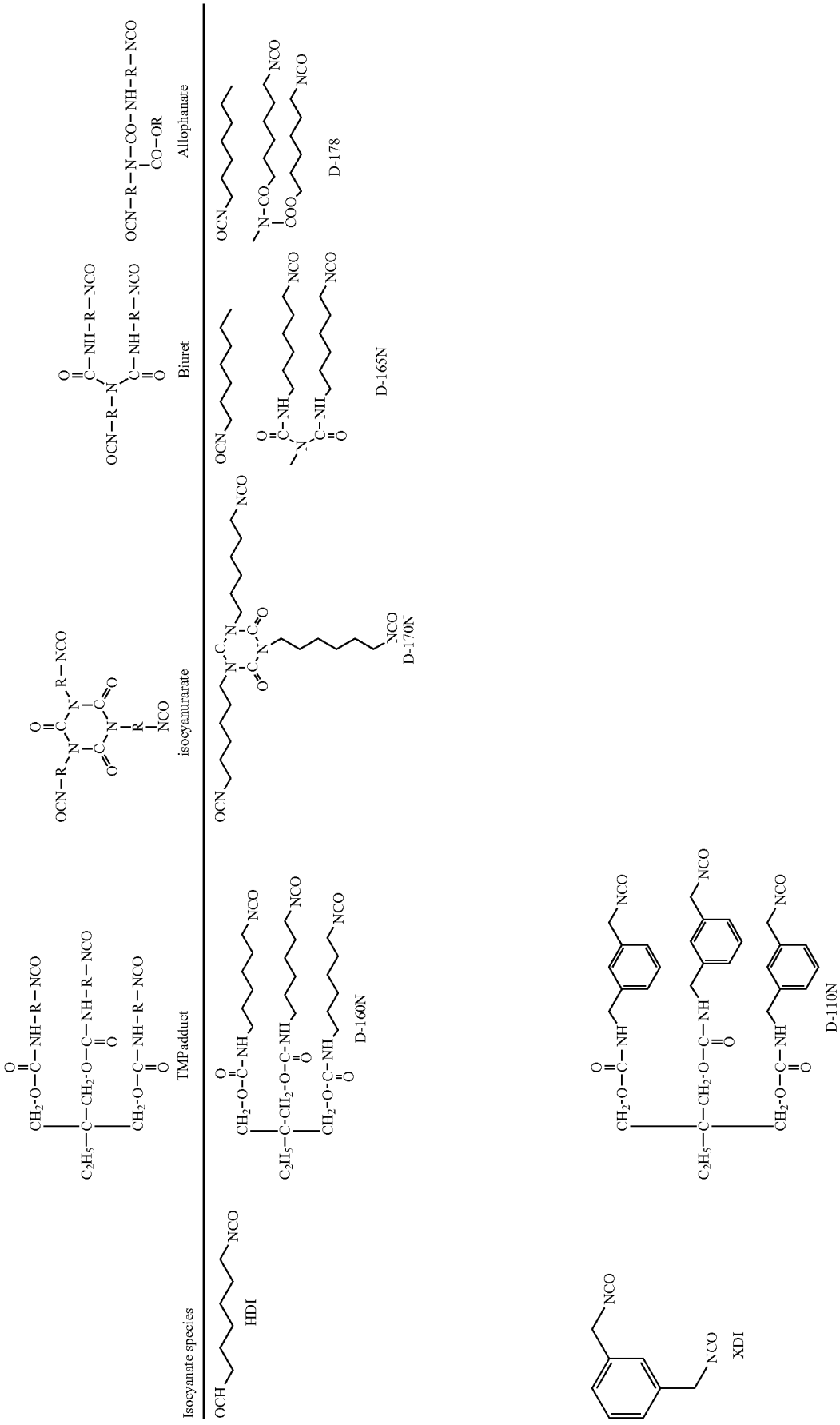

-continued

| Isocyanate species | Modifications | | |
|---|---|---|---|
| | TMPadduct | isocyanurarate | Biuret |
| | | | Allophanate |

The above results indicate that, as shown by Comparative Example A1, the contrast of the display device decreased as the decrease of the temperature. The display devices of Examples achieved a higher contrast than those of Comparative Examples at a low temperature (10° C.).

Example B

Comparative Examples B1, Examples B1 to B5

Liquid crystal display devices are made and evaluated in the same manner as Example A1, except that the contents of "TAKENATE D-110N" (tradename, manufactured by Takeda Pharmaceutical Company Limited)" and "DESMODUR Z4470" (tradename, manufactured by Sumitomo-Bayer Urethane Co., Ltd.) as polyvalent isocyanates are changed according to Table 3. In addition to the evaluation of contrast, evaluation of afterimage index is also conducted.

Afterimage Index

Figure 4:
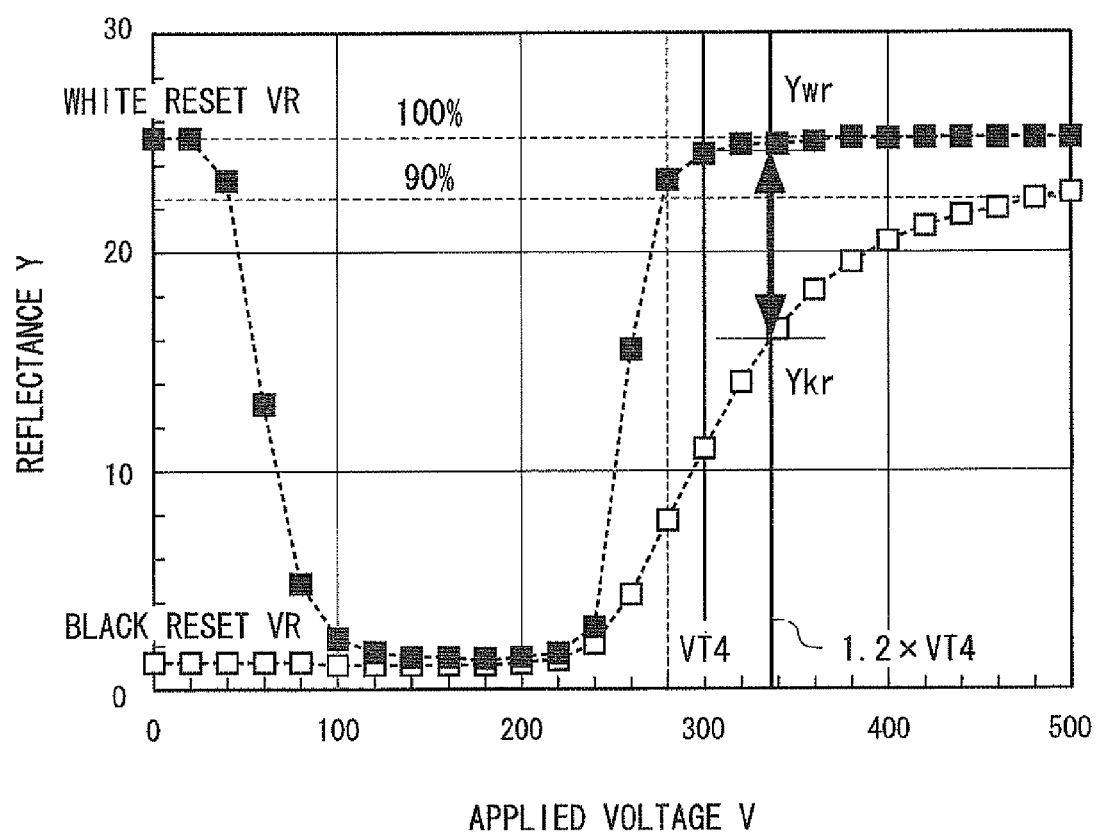
FIG. 4 is a graph explaining afterimage index.

To evaluate the degree of afterimaging, an afterimage index is defined and measured as described below (refer also to FIG. 4). First, as described in the evaluation method of CR (contrast), the voltage-reflectance characteristic Ywr (V) of a white reset is determined. Subsequently, the same measurement is conducted at a reset voltage of 200 V, and thereby the electric current-reflectance characteristic Ykr (V) of a black reset may be determined. In the voltage-reflectance characteristic of the white reset, the voltage at which the reflectance reached 90% of the maximum value is defined as VT4.

With these values, the afterimage index is defined by the following formula:

Afterimage index=($Ywr(1.2 \times VT4) - Ykr(1.2 \times VT4)$)/$Ykr(1.2 \times VT4)$

TABLE 3

|  | Polyvalent isocyanate "DESMODUR Z4470" (isocyanurate having a cyclo ring, manufactured by Sumitomo-Bayer Urethane Co., Ltd.) Part/wt % relative to total isocyanate component | "TAKENATE D-110N" (isocyanate other than the isocyanurate having a cyclo ring, manufactured by Takeda Pharmaceutical Company Limited.) Part | Evaluation Contrast (10° C.) | Afterimage index |
|---|---|---|---|---|
| Comparative Example B1 | None/0 wt % | 10 parts | 4.2 | 2.3 |
| Example B1 | 0.5 parts/5 wt % | 9.5 parts | 4.8 | 1.8 |
| Example B2 | 1 part/10 wt % | 9 parts | 6.6 | 3.3 |
| Example B3 | 1.5 parts/15 wt % | 8.5 parts | 7.8 | 3.3 |
| Example B4 | 2 parts/20 wt % | 8 parts | 7.9 | 3.4 |
| Example B5 | 2.5 parts/25 wt % | 7.5 parts | 8.8 | 9.8 |

The above results indicate that the contrast at a low temperature increased in Examples wherein the content of the first isocyanurate having a cyclo ring had been increased, in particular, to a predetermined value. It is also indicated that the content of the first isocyanurate having a cyclo ring is preferably below the specified range for preventing the afterimage phenomenon.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A liquid crystal-containing composition comprising a cholesteric liquid crystal and microcapsules containing the cholesteric liquid crystal and having a wall component comprising:
   at least one selected from the group consisting of polyurethane and polyurea;
   a first isocyanate component that is an isocyanurate component having a cyclo ring structure; and
   a second isocyanate component other than the first isocyanate component.

2. The liquid crystal-containing composition of claim 1, wherein the first isocyanate component that is the isocyanurate component having a cyclo ring structure is a component derived from at least one selected from the group consisting of the isocyanurates expressed by structural formula (1) or (2), and the respective derivatives thereof.

structural formula (1)

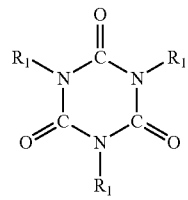

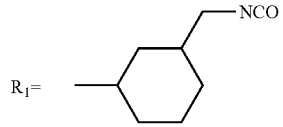

structual formula (2)

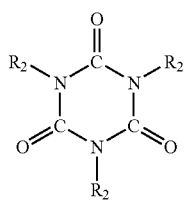

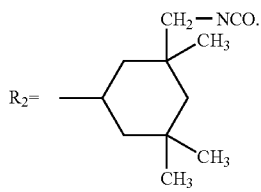

3. The liquid crystal-containing composition of claim 1, wherein the content of the first isocyanate component that is the isocyanurate component having a cyclo ring structure is from about 5 wt % to about 20 wt % with respect to the total amount of the isocyanate components.

4. The liquid crystal-containing composition of claim 1, wherein the second isocyanate component other than the first isocyanate component comprises a polyvalent isocyanate.

5. The liquid crystal-containing composition of claim 1, wherein the microcapsules further comprise a polyol component.

6. The liquid crystal-containing composition of claim 5, wherein the weight average molecular weight of the polyol component is from about 20,000 to about 100,000.

7. The liquid crystal-containing composition of claim 5, wherein the content of the polyol component is from about 5 wt % to about 25 wt % with respect to the total amount of the capsule wall components.

8. The liquid crystal-containing composition of claim 5, wherein the polyol component comprises a polyester polyol component or a polyether polyol component.

9. The liquid crystal-containing composition of claim 1, wherein the microcapsules further comprise a vertical orientation component.

10. The liquid crystal-containing composition of claim 9, wherein the vertical orientation component comprises a orientation material including a compound having an alkyl group and/or a fluoroalkyl group, the compound also having a hydroxy group.

11. A liquid crystal display device comprising a pair of electrodes and the liquid crystal-containing composition of claim 1 sandwiched between the pair of electrodes.

* * * * *